United States Patent
Novak et al.

(10) Patent No.: US 11,494,348 B2
(45) Date of Patent: Nov. 8, 2022

(54) SYSTEM AND METHOD FOR USING OBJECT REFERENCES AS A DATA TYPE

(71) Applicant: Microsoft Technology Licensing, LLC, Redmond, WA (US)

(72) Inventors: Michael John Novak, Redmond, WA (US); Elizabeth Picchietti Salowitz, Seattle, WA (US); Anshul Rawat, Kirkland, WA (US); John Edward Gallardo, Woodinville, WA (US); Vikas Chandra Bhatia, Kirkland, WA (US); Shawn Patrick Henry, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 424 days.

(21) Appl. No.: 16/005,424

(22) Filed: Jun. 11, 2018

(65) Prior Publication Data

US 2019/0377808 A1 Dec. 12, 2019

(51) Int. Cl.
  *G06F 16/20* (2019.01)
  *G06F 16/21* (2019.01)
(52) U.S. Cl.
  CPC .................. *G06F 16/211* (2019.01)
(58) Field of Classification Search
  CPC .................................................. G06F 16/211
  See application file for complete search history.

(56) References Cited

U.S. PATENT DOCUMENTS

| | | | |
|---|---|---|---|
| 2012/0289290 A1* | 11/2012 | Chae | G06F 3/0488 455/566 |
| 2013/0132868 A1* | 5/2013 | Hackett | G06F 16/958 715/760 |
| 2016/0330256 A1 | 11/2016 | Novak et al. | |

(Continued)

OTHER PUBLICATIONS

Dave Wilson ("IrinVoso") et al., MicrosoftDocs / winrt-api, May 11, 2017 [retrieved on Jul. 21, 2020]. Retrieved from the Internet:< URL: https://github.com/MicrosoftDocs/winrt-api/tree/8929a19d4c7be6f0e66044c6b1900e7a74523d9f/windows.applicationmodel.useractivities >. (Year: 2017).*

(Continued)

*Primary Examiner* — Kristopher Andersen
(74) *Attorney, Agent, or Firm* — Rainier Patents, P.S.

(57) ABSTRACT

Described herein is a system and method for using object references as a data type. In response to a request for an object reference for an object by a consuming application, the object reference is generated by a source application. The object reference comprises a data structure comprising an activation uniform resource identifier for activating the referenced object, information for visually representing the object reference, and, optionally, metadata that describes the referenced object. The generated object reference is provided to an operating system component by the source application which provides the object reference to a consuming application. The consuming application can display information regard the object reference in accordance with the information for visually representing the object reference included in the object reference. The user can request reactivation of the object referenced by the object reference.

23 Claims, 6 Drawing Sheets

(56) References Cited

U.S. PATENT DOCUMENTS

2017/0155658 A1 6/2017 Mullins et al.
2018/0121849 A1 5/2018 Torres et al.

OTHER PUBLICATIONS

GitHub API, Mar. 2021 [retrieved on Mar. 11, 2021]. Retrieved from the Internet:< URL: https://api.github.com/repos/MicrosoftDocs/winrt-api >. (Year: 2021).*

MicrosoftDocs / winrt-api, Jun. 4, 2018 [retrieved on Feb. 18, 2021]. Retrieved from the Internet:< https://web.archive.org/web/20180604101823/https://github.com/MicrosoftDocs/winrt-api/ >. (Year: 2018).*

Nulltoken, How to find the created date of a repository project on GitHub? 2014 [retrieved on Mar. 11, 2021]. Retrieved from the Internet:< https://stackoverflow.com/a/23612723 >. (Year: 2014).*

Jim Walker ("jwmsft"), Fix typo in controltemplate_targettype.md #113, Jun. 9, 2017 [retrieved on Mar. 11, 2021]. Retrieved from the Internet<: https://github.com/MicrosoftDocs/winrt-api/pull/113 > and <: https://github.com/MicrosoftDocs/winrt-api/tree/f3147203e9e954fb876a2456038beba2e3932b53 >. (Year: 2017).*

"UserActivity Class", Microsoft Corporation, retrieved from "https://docs.microsoft.com/en-us/uwp/api/windows.applicationmodel.useractivities.useractivity" on Jun. 7, 2018, 3 pages.

"UserActivity.ToJson Method", Microsoft Corporation, retrieved from "https://docs.microsoft.com/en-us/uwp/api/windows.applicationmodel.useractivities.useractivity.tojson" on Jun. 7, 2018, 2 pages.

"UserActivity.ToJsonArray(IIterable<UserActivity>) Method", Microsoft Corporation, retrieved from "https://docs.microsoft.com/en-us/uwp/api/windows.applicationmodel.useractivities.useractivity.tojsonarray" on Jun. 7, 2018, 2 pages.

"DataPackage Class", Microsoft Corporation, retrieved from "https://docs.microsoft.com/en-us/uwp/api/windows.applicationmodel.datatransfer.datapackage" on Jun. 7, 2018, 5 pages.

"Windows.ApplicationModel.DataTransfer Namespace", Microsoft Corporation, retrieved from "https://docs.microsoft.com/en-us/uwp/api/windows.applicationmodel.datatransfer" on Jun. 7, 2018, 3 pages.

* cited by examiner

SYSTEM AND METHOD FOR USING OBJECT REFERENCES AS A DATA TYPE

BACKGROUND

With increasing frequency computing devices have become intertwined with user's everyday lives. Most experiences a user has are based on generation and/or consumption of data through application(s), for example, website(s) utilized, communication(s) the user has participated in, playlists the user has created, music the user has listened to. Frequently, this data is managed by different applications running on different devices having different operating systems.

SUMMARY

Described herein is an object reference system, comprising: a computer comprising a processor and a memory having computer-executable instructions stored thereupon which, when executed by the processor, cause the computer to: in response to a request for an object reference for an object, generate the object reference by a source application, the object reference comprising a data structure comprising an activation uniform resource identifier for activating the referenced object and information for visually representing the object reference, and, optionally, schematized metadata describing the referenced object; and provide, by the source application, the generated object reference to an operating system component.

Further described herein is a computer storage media storing computer-readable instructions that when executed cause a computing device to: receive user input to obtain an object reference from a source application; request the object reference from the source application; in response to the request, receive the object reference; display information regarding the object reference in accordance with information for visually representing the object reference included in the object reference.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to, in response to a request (e.g., from a consuming application), providing encapsulated information regarding a user's task within a source application that can be continued at a later time are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding, in response to a request, providing encapsulated information regarding a user's task within a source application that can be continued at a later time. What follows are one or more exemplary systems and methods.

Aspects of the subject disclosure pertain to the technical problem of allowing a user to automatically reengage in a task of a source application at a later time. The technical features associated with addressing this problem include, in response to a request for an object reference for an object (e.g., generated by a consuming application), generating the object reference to an operating system component by a source application, the object reference comprising a data structure comprising an activation uniform resource identifier for activating the referenced object, information for visually representing the object reference and, optionally, metadata that describes the referenced object; and providing the object reference to an operating system component. Accordingly, aspects of these technical features exhibit technical effects of more efficiently and effectively allowing a user to reengage in a task of the application thus reducing consumption of computer resource(s) and/or reducing user frustration.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

User(s) engage with content in an ever-increasing variety of ways. Described herein is a framework for exchanging object references between applications that allows these object references (e.g., information regarding user activity) of many kinds of applications to be organized and represented in a consistent way across disparate application(s), disparate device(s), and/or disparate operating system(s). "Object" refers to a discrete unit of user engagement (e.g., anything the user would collect).

Figure 1:
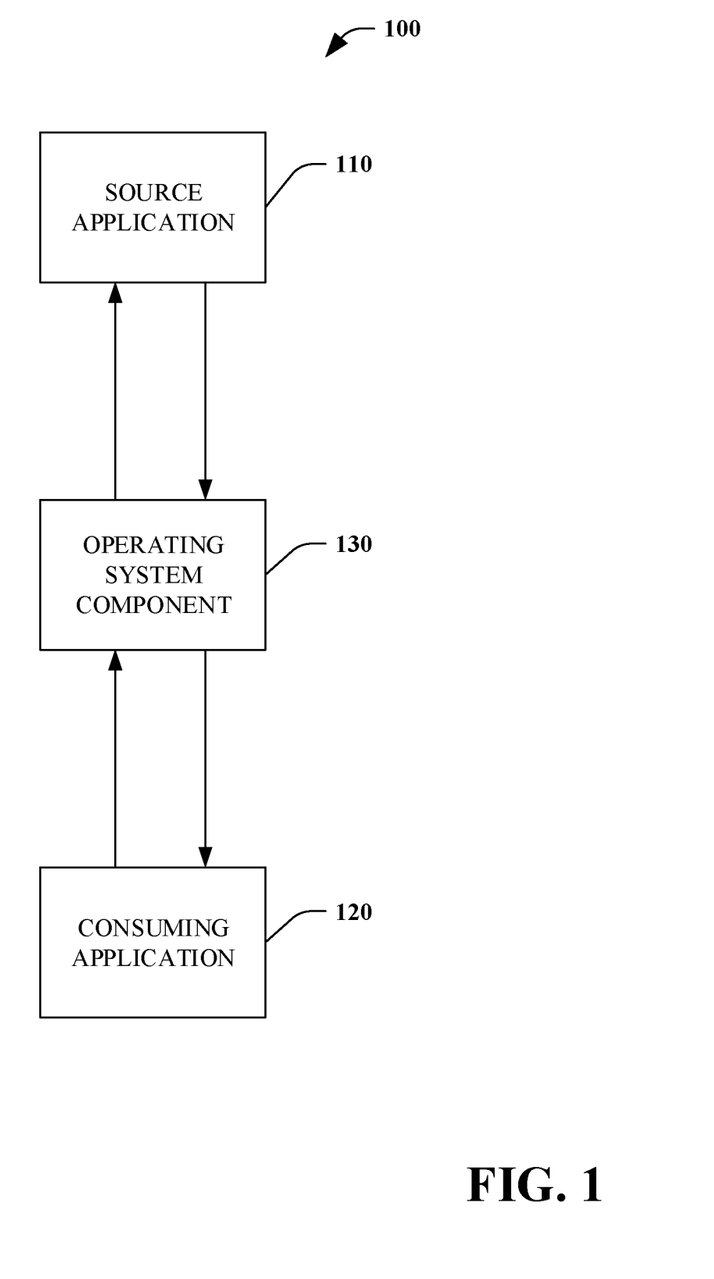
FIG. 1 is a functional block diagram that illustrates an object reference system.

Referring to FIG. 1, an object reference system 100 is illustrated. The system 100 enables a source application 110 to provide object reference(s) (e.g., information regarding a user activity) to a consuming application 120 using an operating system component 130.

An "object reference" is a structured collection of properties that can describe, visualize, and/or activate the referenced object. In some embodiments, the object reference is a pointer to a unit of user engagement. In some embodiments, the object reference can refer to experience(s) and/or content such as file(s), application(s), web site(s), deep link(s) within application(s) and/or any other entity that can be addressed by a uniform resource identifier (URI). In some embodiments, the object reference is stored in a pure data format (e.g., JavaScript Object Notation (JSON) format) and can be directly copied between applications (via the operating system component 130) and/or a storage location that supports object reference(s).

Figure 2:
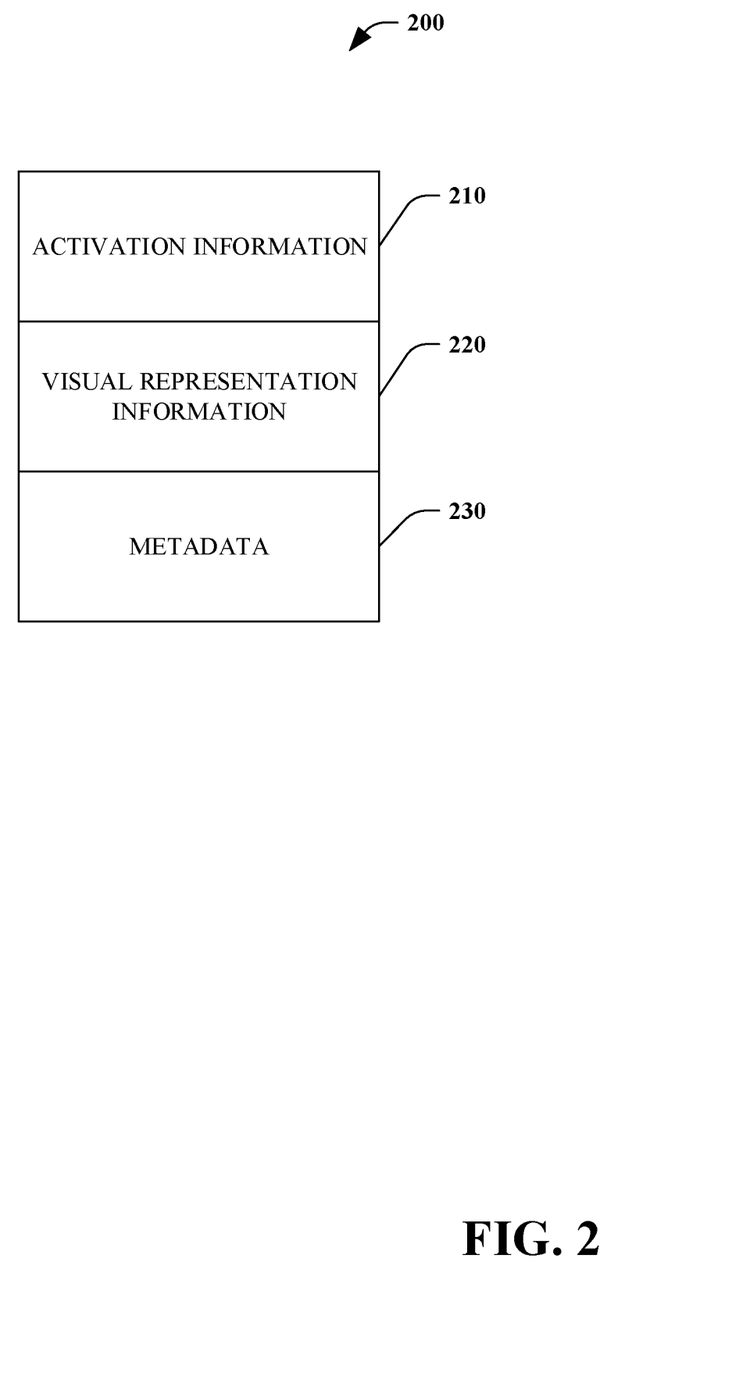
FIG. 2 is a block diagram of an extensible data structure for an object reference.

Turning briefly to FIG. 2, in some embodiments, the system 100 utilizes an extensible data structure for an object reference 200 including an activation URI 210, information for visually representing the object reference 220, and, optionally, and metadata that describes the referenced object 230. In some embodiments, the data structure for the object reference 200 is generated/provided in JSON format.

With continued reference to FIGS. 1 and 2, in some embodiments, the source application 110 can provide information regarding a task a user is engaged when the request is initiated by the consuming application 120 and/or by the operating system component 130. In some embodiments, the source application 110 can provide information regarding a task the user is engaged in when the request is received by the source application 110. In some embodiments, the source application 110 can generate the object reference in response to the request (e.g., on demand retrieval of object reference).

In some embodiments, the source application 110 can determine what information the source application 110 reveals regarding the user's activity based upon predefined setting(s) (e.g., application-specific and/or user-specific policy). In some embodiments, the source application 110 can be configured to provide precise and descriptive information in the object reference 200, for example, regarding an activity in which the user is engaged. In this scenario, the activation URI 210 can provide information allowing the user to later reengage and continue with task the user was engaged in with the source application 110.

In some embodiments, the source application 110 can be configured to provide generic information in the object reference, for example, providing no user-specific information regarding an activity in which the user is engaged. For example, the activation URI 210 can provide information allowing the user to reengage with the source application 110 at a generic entry point. In some embodiments, the activation URI 210 can reference the identity of the source application across one or more platforms/operating systems.

The data structure for the object reference 200 allows the source application 110 to control how the object reference is displayed by the consuming application 120 via the information for visually representing the object reference 220. In some embodiments, the information for visually representing the object reference 220 can include a size of a visual representation, color(s) of the visual representation (e.g., background, foreground), image(s), video(s), and/or text. In some embodiments, the information for visually representing the object reference 220 can provide an opportunity for the source application 110 to provide brand-specific information. In doing so, the brand-specific information can be utilized to visually represent the object reference 220 across disparate consuming application(s) 120, disparate device(s), and/or disparate operating system(s).

The data structure for the object reference 200 further allows the source application 110 to control how the object reference is described by the consuming application 120 via the metadata that describes the referenced object 230. In some embodiments, the metadata is provided in an extensible schema (e.g., published by schema.org). The information provided in the metadata can be based on a type of object being referenced (e.g., book, playlist, audio track, image, word processing document, spreadsheet, web site visited).

In some embodiment, the consuming application 120, using the provided object reference (e.g., data structure for the object reference 200), can provide to the user a visual representation of the object reference using the information for visually representing the object reference 220 (e.g., via canvas of application 120). The consuming application 120, using the provided object reference, can further provide to the user information regarding the referenced object using the metadata that describes the referenced object 230.

In some embodiments, selection of the visual representation of the object reference via the consuming application 120 can cause the consuming application 120 to provide the activation URI to the operating system component 130 in order to allow the user to reengage with the source application 110.

In some embodiments, the user can selectively provide a particular object reference, for example, to another consuming application 120 on the same or different device and/or operating system. In some embodiments, the user can selectively provide the particular object reference to other user(s), for example, via text message, instant message, telecommunications application, email, and/or a collaborative workspace.

In some embodiments, the source application 110 provides the object reference 200 in response to a request from the consuming application 120. For example, the request can be in response to user input received by the consuming application 120. In some embodiments, the source application 110 provides the object reference in response to a request generated by the operating system component 130.

In some embodiments, using the object reference 200, the source application 110 self-describes an activity in which the user is engaged. In some embodiments, the source application 110 can determine what information the source application 110 reveals regarding the user's activity based upon user-configurable setting(s) (e.g., application-specific and/or user-specific policy). In some embodiments, a policy can allow precise information regarding the user's activity with the source application 110. Accordingly, the activation URI 210 can provide information allowing the user to later reengage and continue with task the user was engaged in with the source application 110. In some embodiments, a policy can allow limited information regarding the user's activity with the source application 110. In this scenario, the activation URI 210 can provide information allowing the user to reengage with the source application 110 at a generic entry point.

In some embodiments, object reference(s) can be utilized to facilitate copy/paste, sharing, and/or drag and drop of objects from the source application 110 to the consuming application 120. Using the object reference, the consuming application 120 can then visualize the object and provide an ability to re-activate the object.

By way of explanation and not limitation, a user can desire to save a particular playlist of a music streaming application (e.g., source application 110) onto a desktop surface (e.g., consuming application 120). In this manner, the user can easily start playing the particular playlist without having to launch the music streaming application, find the particular playlist in the user's recent playlists, and hit "play". In some embodiments, with the system 100, the user can drag the playlist header from a window associated with the music streaming application and drop it on the desktop surface.

In some embodiments, the music streaming application (source application 110) can receive an empty data transport container (e.g., DataPackage) from the operating system component 130. In some embodiments, the playlist object itself can comprise information that the music streaming application will not release since it includes licensed intellectual property to which the user has subscribed. In some embodiments, instead of releasing the playlist object itself, the music streaming application can generate an object reference that encapsulates the particular playlist which is then provided to the operating system component 130, for example, in the data transport container. The operating system component 130 can provide the object reference to the desktop surface.

In accordance with information provided in the object reference, the desktop surface can then visualize the particular playlist and provide the ability to re-activate the particular playlist from the desktop surface. Selection of the object reference from within the desktop surface can launch the URI associated with the object reference resulting in playing of the particular playlist and/or launching of the music streaming application.

In another example, a user can desire to save information to a desktop surface (e.g., consuming application 120) regarding the user's current use of a word processing application (e.g., source application 110) and, more specifically, the user's current cursor location within each of a plurality of open documents. By selecting and dragging a portion of a window associated with each of the open documents, the user can cause the system 100 to request object references from the word processing application. The word processing application can then generate object references for each of the plurality of open documents which are provided to the desktop surface via the operating system component 130. The desktop surface can then provide visuals for each of the selected open documents based upon information provided in the object references. Selection of the object reference from within the desktop surface can launch the URI associated with the object reference resulting in opening of the particular document to the particular cursor location using the word processing application.

Figure 3:
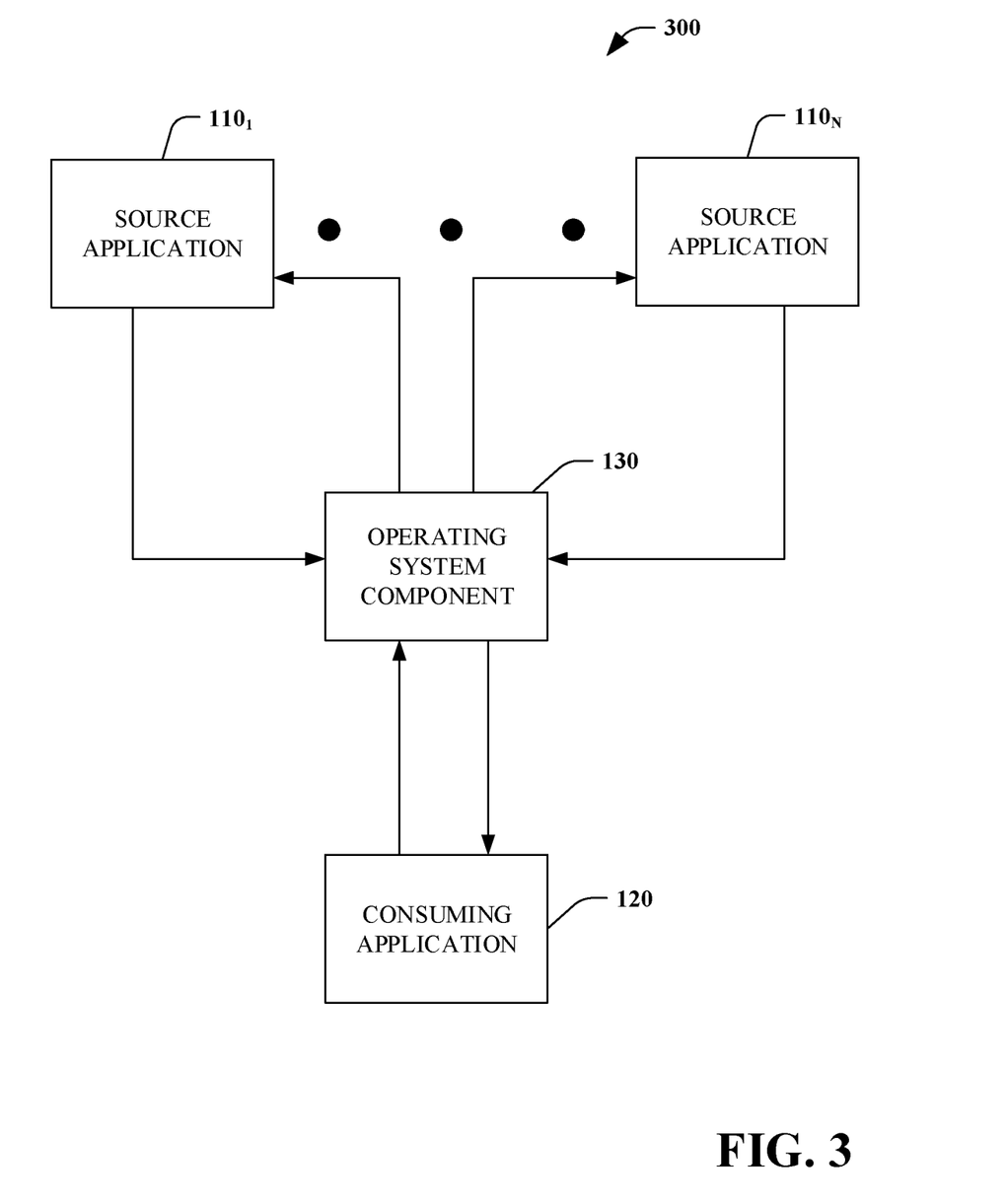
FIG. 3 is a functional block diagram that illustrates an object reference system.

Turning to FIG. 3, an object reference system 300 is illustrated. In some embodiments, when a plurality of source applications 110$_1$-110$_N$ (collectively referred to as 110) are being used by a user, the user can indicate the user's desire to capture object references for each of the plurality of source applications 110 via a consuming application 120.

The consuming application 120 can provide a request to each of the plurality of source applications 110 through the operating system component 120. In some embodiments, the operating system component 120 generates and provides the request to each of the plurality of source applications 110.

Each of the plurality of source applications 110 can then provide to the consuming application 120, through the operating system component, an object reference that encapsulates the user's activity within the particular source application 110 (e.g., based upon a user and/or application policy). These object references can then be displayed to the user via the consuming application 120 in accordance with the information for visually representing the object reference 220 of each respective object reference. In some embodiments, the user can then reengage with a particular source application 110 by selecting a visual representation corresponding to the particular source application.

Figure 4:
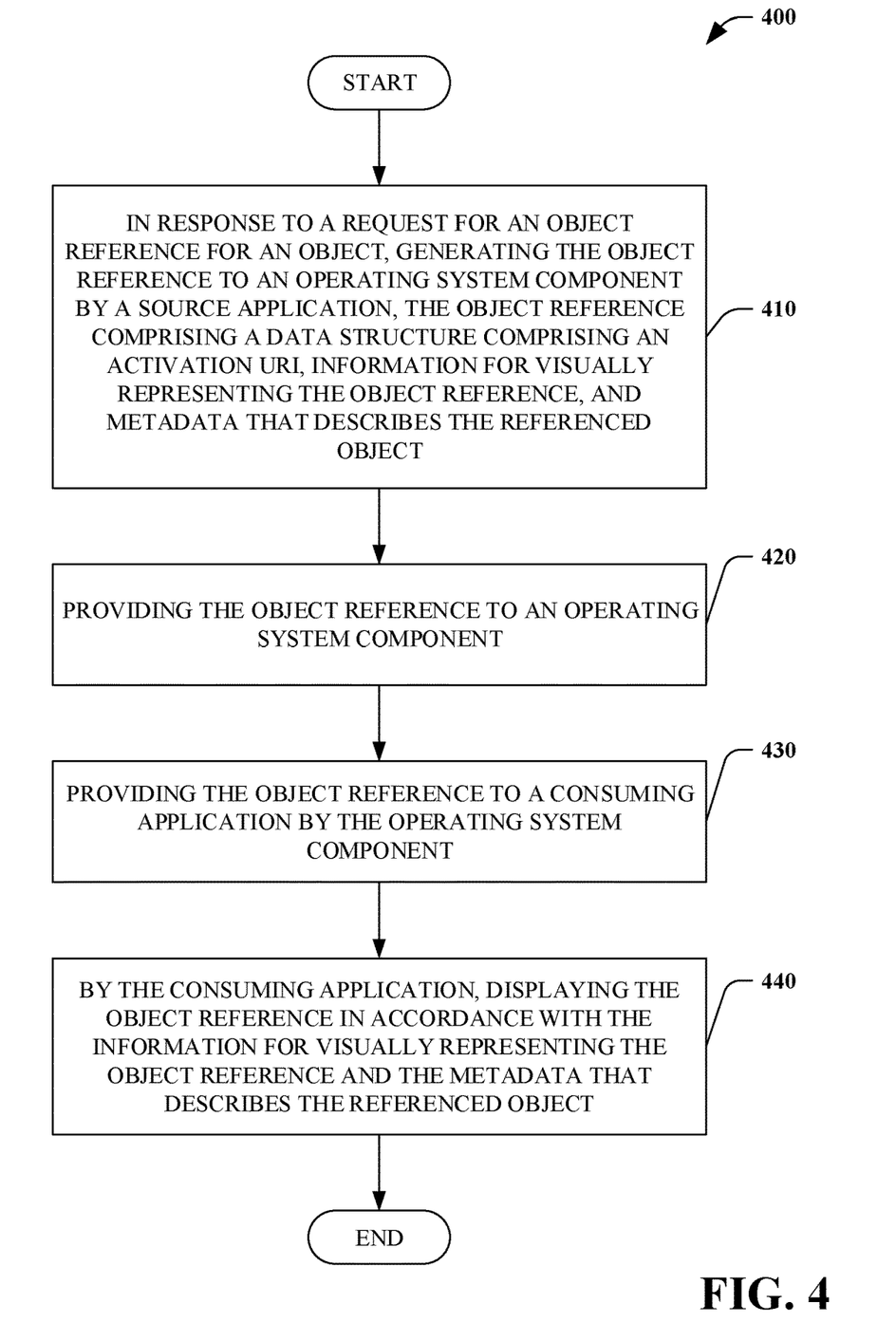
FIG. 4 is a flow chart that illustrates a method of using object references as a data type.
Figure 5:
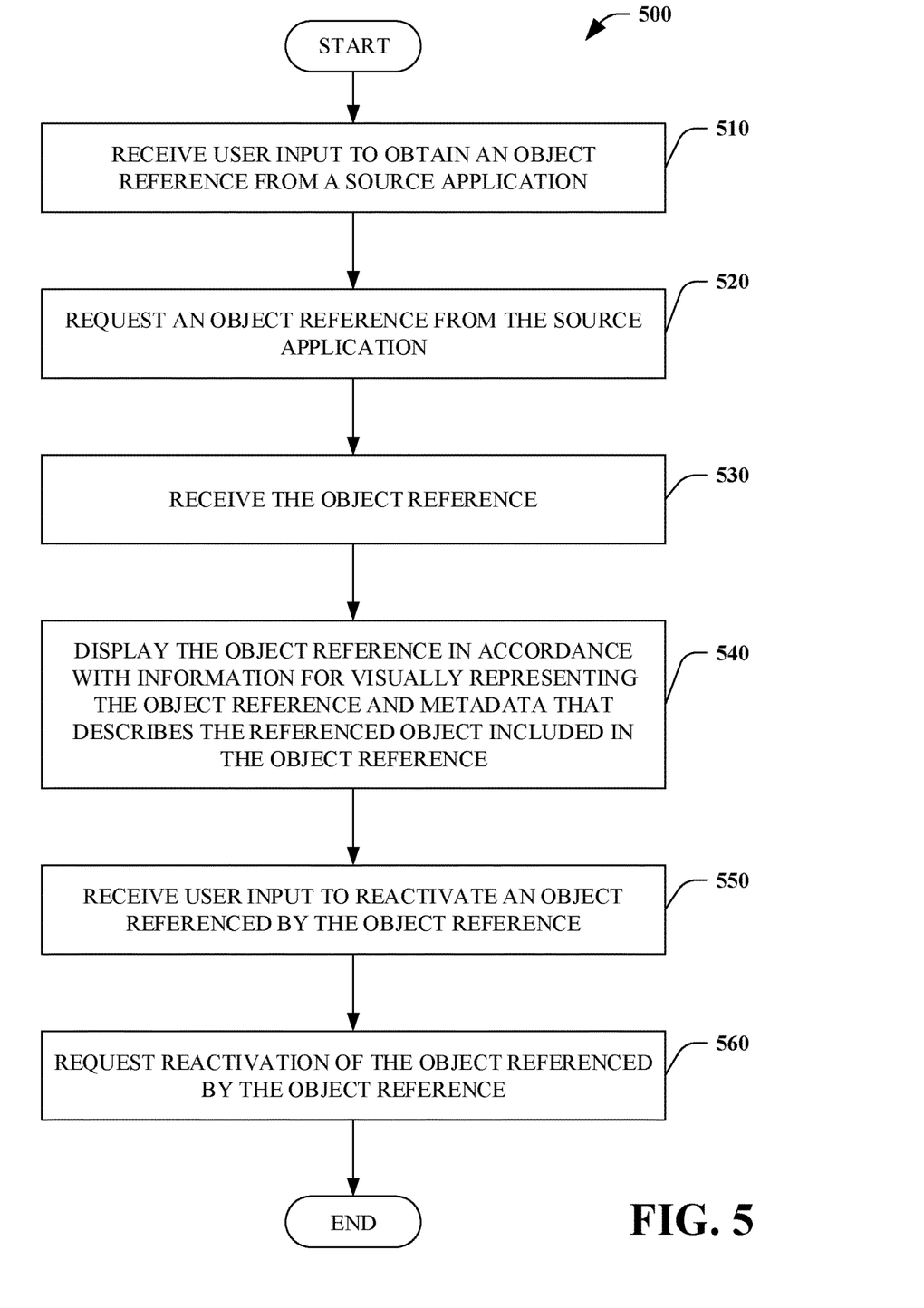
FIG. 5 is a flow chart that illustrates another method of using object references as a data type.

FIGS. 4 and 5 illustrate exemplary methodologies using object references as a data type. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 4, a method of using object references as a data type 400 is illustrated. In some embodiments, the method 400 is performed by the system 100.

At 410, in response to a request for an object reference for an object, generating the object reference by a source application. The object reference comprises a data structure comprising an activation URI, information for visually representing the object reference, and, optionally, metadata that describes the referenced object. At 420, the generated object reference is provided by the source application to an operating system component.

At 430, the object reference is provided to a consuming application by the operating system component. At 440, the object referenced is displayed, by the consuming application, in accordance with the information for visually representing the object reference and, optionally, the metadata that describes the referenced object.

Referring to FIG. 5, a method of using object references as a data type 500 is illustrated. In some embodiments, the method 500 is performed by the consuming application 120.

At 510, user input to obtain an object reference from a source application is received (e.g., by a consuming application). At 520, a request is made for an object reference from the source application (e.g., by the consuming application). At 530, the object reference is received (e.g., by the consuming application).

At 540, information regarding the object reference is displayed (e.g., by the consuming application) in accordance with information for visually representing the object reference and, optionally, metadata that describes the referenced object included in the object reference. At 550, user input is received (e.g., by the consuming application) to reactivate an object referenced by the object reference. At 560, reactivation of the object referenced by the object reference is requested (e.g., by the consuming application). Reactivation can be in accordance with an activation URI provided in the object reference.

Figure 6:
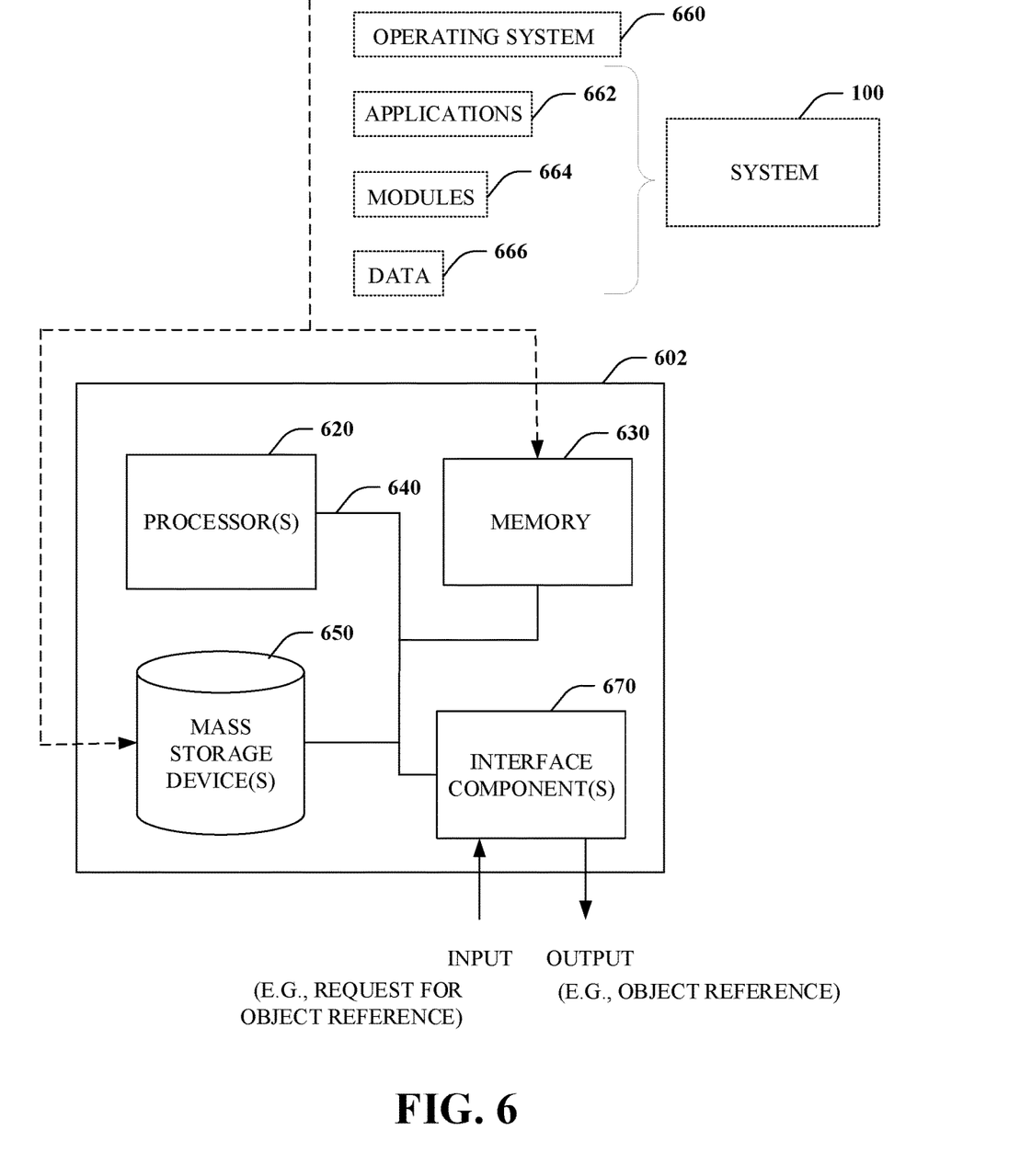
FIG. 6 is a functional block diagram that illustrates an exemplary computing system.

With reference to FIG. 6, illustrated is an example general-purpose computer or computing device 602 (e.g., mobile phone, desktop, laptop, tablet, watch, server, handheld, programmable consumer or industrial electronics, set-top box, game system, compute node, etc.). For instance, the computing device 602 may be used in an object reference system 100.

The computer 602 includes one or more processor(s) 620, memory 630, system bus 640, mass storage device(s) 650, and one or more interface components 670. The system bus 640 communicatively couples at least the above system constituents. However, it is to be appreciated that in its simplest form the computer 602 can include one or more processors 620 coupled to memory 630 that execute various computer executable actions, instructions, and or components stored in memory 630. The instructions may be, for instance, instructions for implementing functionality described as being carried out by one or more components discussed above or instructions for implementing one or more of the methods described above.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 620 can be a graphics processor.

The computer 602 can include or otherwise interact with a variety of computer-readable media to facilitate control of the computer 602 to implement one or more aspects of the claimed subject matter. The computer-readable media can be any available media that can be accessed by the computer 602 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 602. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 630 and mass storage device(s) 650 are examples of computer-readable storage media. Depending on the exact configuration and type of computing device, memory 630 may be volatile (e.g., RAM), non-volatile (e.g., ROM, flash memory, etc.) or some combination of the two. By way of example, the basic input/output system (BIOS), including basic routines to transfer information between elements within the computer 602, such as during start-up, can be stored in nonvolatile memory, while volatile memory can act as external cache memory to facilitate processing by the processor(s) 620, among other things.

Mass storage device(s) 650 includes removable/non-removable, volatile/non-volatile computer storage media for storage of large amounts of data relative to the memory 630. For example, mass storage device(s) 650 includes, but is not limited to, one or more devices such as a magnetic or optical disk drive, floppy disk drive, flash memory, solid-state drive, or memory stick.

Memory 630 and mass storage device(s) 650 can include, or have stored therein, operating system 660, one or more applications 662, one or more program modules 664, and data 666. The operating system 660 acts to control and allocate resources of the computer 602. Applications 662 include one or both of system and application software and can exploit management of resources by the operating system 660 through program modules 664 and data 666 stored in memory 630 and/or mass storage device (s) 650 to perform one or more actions. Accordingly, applications 662 can turn a general-purpose computer 602 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 662, and include one or more modules 664 and data 666 stored in memory and/or mass storage device(s) 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 602 also includes one or more interface components 670 that are communicatively coupled to the system bus 640 and facilitate interaction with the computer 602. By way of example, the interface component 670 can be a port (e.g., serial, parallel, PCMCIA, USB, FireWire, etc.) or an interface card (e.g., sound, video, etc.) or the like. In one example implementation, the interface component 670 can be embodied as a user input/output interface to enable a user to enter commands and information into the computer 602, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 670 can be embodied as an output peripheral interface to supply output to displays (e.g., LCD, LED, plasma, etc.), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
a processor; and
a memory storing a source application, a consuming application, and an operating system, the memory having computer-executable instructions stored thereupon which, when executed by the processor, cause the source application to:
display an object;
receive a request from the operating system to generate an object reference for the object, the request corresponding to a drag and drop input directed to the object displayed by the source application;
in response to receiving the request from the operating system, generate the object reference for the object, the object reference comprising a data structure that includes an activation uniform resource identifier that refers to the object and visual representation information controlling how the object reference is to be visually represented by the consuming application;
provide the object reference to the operating system, wherein the operating system is configured to provide the object reference to the consuming application according to the drag and drop input; and
subsequently reactivate the object in response to an indication that the activation uniform resource identifier that refers to the object has been launched via the consuming application,
wherein the object reference is generated by the source application in accordance with a policy that specifies certain information included in the object that the source application does not reveal to the consuming application via the object reference.

2. The system of claim 1, wherein the object reference further comprises metadata that describes the object.

3. The system of claim 2, wherein the metadata is stored in an extensible schema.

4. The system of claim 3, wherein information stored in the extensible schema is based on a type of the object.

5. The system of claim 1, wherein the object reference comprises a pointer to the object.

6. The system of claim 5, the memory having further computer-executable instructions stored thereupon which, when executed by the processor, cause the operating system to:
perform a drag and drop of the object in response to the drag and drop input by providing the object reference to the consuming application without providing the entirety of the object to the consuming application.

7. The system of claim 6, the memory having further computer-executable instructions stored thereupon which, when executed by the processor, cause the consuming application to:
display information regarding the object reference in accordance with the visual representation information.

8. The system of claim 7, the memory having computer-executable instructions stored thereupon which, when executed by the processor, cause the consuming application to:
receive user input to reactivate the object; and
in response to the user input to reactivate the object, request reactivation of the object using the activation uniform resource identifier of the object reference.

9. The system of claim 1, wherein the policy is an application-specific policy.

10. The system of claim 1, wherein the policy is a user-configurable policy.

11. A method, comprising:
by a source application:
displaying an object;
receiving, from an operating system, a request for an object reference for the object displayed by the source application, the request corresponding to a copy input directed to the object displayed by the source application;
in response to the request received from the operating system, generating the object reference, wherein the object reference includes an activation uniform resource identifier that refers to the object, visual representation information controlling how the object reference is to be visually represented by a consuming application, and metadata that describes the object;
providing the object reference to the operating system, wherein the operating system is configured to paste the object reference to the consuming application; and
subsequently reactivating the object in response to an indication that the activation uniform resource identifier that refers to the object has been launched via the consuming application,
wherein the object reference is generated by the source application in accordance with a policy that specifies certain information included in the object that the source application does not reveal to the consuming application via the object reference.

12. The method of claim 11, wherein the metadata is stored in an extensible schema.

13. The method of claim 12, further comprising:
determining a type of the object; and
storing information in the extensible schema based at least on the type of the object.

14. The method of claim 11, wherein the object reference is stored in a JavaScript Object Notation (JSON) format.

15. The method of claim 11, further comprising:
by the operating system, pasting the object reference to the consuming application; and
by the consuming application, displaying information regarding the object reference in accordance with the visual representation information.

16. The method of claim 15, further comprising:
by the consuming application:
receiving user input to reactivate the object; and
in response to the user input to reactivate the object, requesting reactivation of the object using the activation uniform resource identifier of the object reference.

17. The method of claim 11, wherein the policy comprises at least one of an application-specific policy or a user-configurable policy.

18. A computer storage media storing computer-readable instructions that, when executed, cause a computing device to:
by an operating system of the computing device:
receive a copy input requesting to copy an object from a source application;
responsive to the copy input, request an object reference for the object from the source application;
receive the object reference from the source application, the object reference including an activation uniform resource identifier that refers to the object and visual representation information controlling how the object reference is to be visually represented by a consuming application;
receive a paste input requesting to paste the object into the consuming application;
responsive to the paste input, provide the object reference to the consuming application, wherein the consuming application is configured to display information regarding the object reference in accordance with the visual representation information;
receive, from the consuming application, an indication that the activation uniform resource identifier that refers to the object has been selected; and
responsive to receiving the indication from the consuming application that the activation uniform resource identifier has been selected, cause the source application to reactivate the object,
wherein the object reference is generated by the source application in accordance with a policy that specifies certain information included in the object that the source application does not reveal to the consuming application via the object reference.

19. The computer storage media of claim 18 storing further computer-readable instructions that, when executed, cause the computing device to:
by the consuming application:
receive user input indicating a request to reactivate the object; and
provide the indication that the activation uniform resource identifier has been selected to the operating system responsive to the user input indicating the request to reactivate the object.

20. The computer storage media of claim 18, wherein the object reference comprises a data structure comprising the activation uniform resource identifier that refers to the object, the visual representation information, and metadata that describes the object.

21. The computer storage media of claim 18, wherein the source application does not release an entirety of the object to the consuming application.

22. The computer storage media of claim 21, wherein the object comprises licensed intellectual property that is not released by the source application to the consuming application.

23. The computer storage media of claim 21, wherein the activation uniform resource identifier comprises an address of the object.

\* \* \* \* \*